June 7, 1938.  H. L. RORDEN  2,120,002
RECTIFIER AND CAPACITOR CHARGER
Filed Aug. 6, 1936

INVENTOR
Harold L. Rorden
BY Alpheus J. Crane
ATTORNEY

Patented June 7, 1938

2,120,002

UNITED STATES PATENT OFFICE 2,120,002

RECTIFIER AND CAPACITOR CHARGER

Harold L. Rorden, Barberton, Ohio, assignor to The Ohio Brass Company, Mansfield, Ohio, a corporation of New Jersey Application August 6, 1936, Serial No. 94,520

4 Claims. (Cl. 175—363)

This invention relates to a charging unit for capacitors in which thermionic valves and transformers are employed for impressing the charged voltage upon the capacitor plates.

One object of the invention is to provide an arrangement of transformers for a charging unit that may be more economically manufactured than transformers heretofore employed for this purpose and assembled in a single casing to provide a simple and compact unit.

A further object of the invention is to provide improved insulation for the transformer windings.

A further object of the invention is to provide apparatus of the class named which shall be of improved construction and operation.

Other objects and advantages will appear from the following description.

The invention is exemplified by the combination and arrangement of parts shown in the accompanying drawing and described in the following specification, and it is more particularly pointed out in the appended claims.

Figures 1, 2:
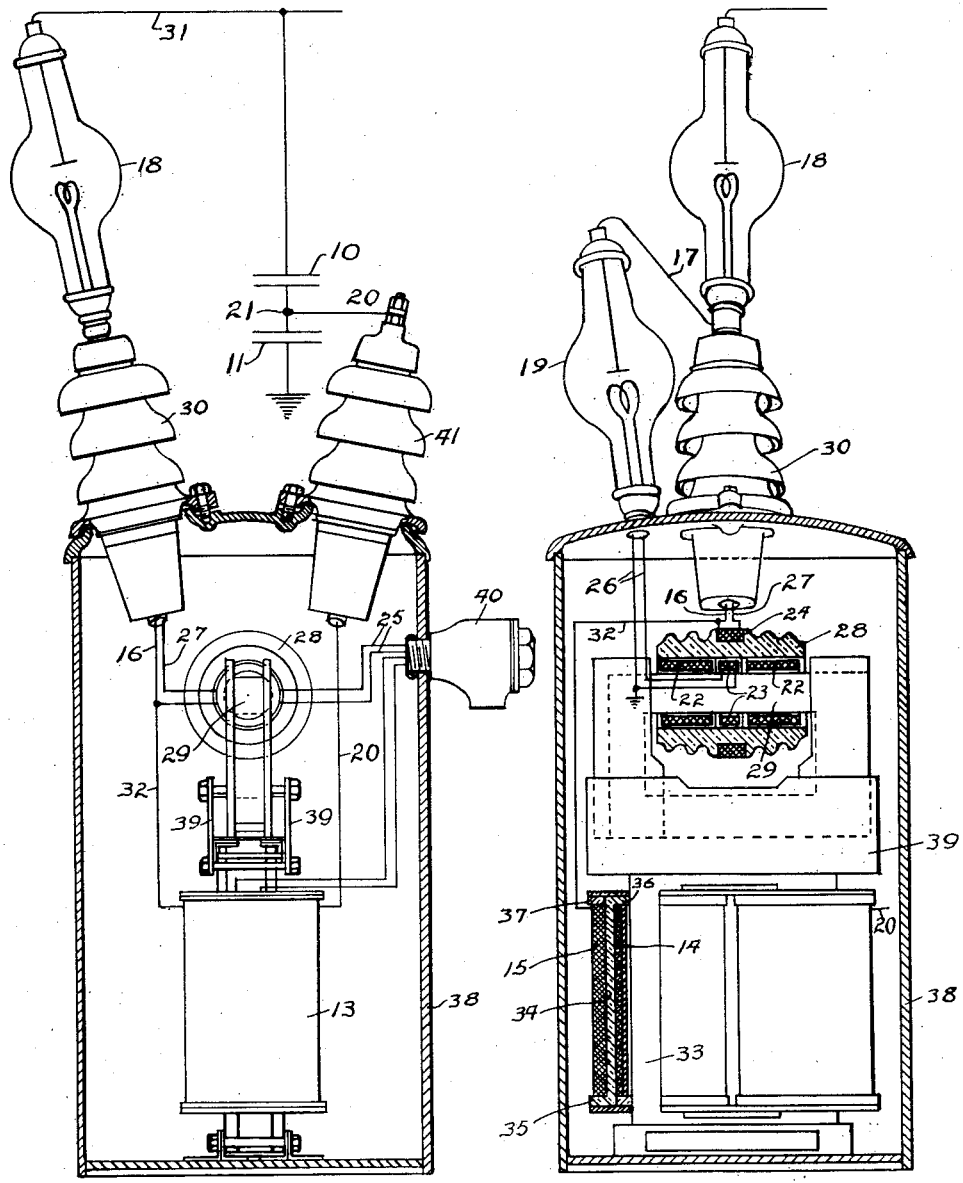
Fig. 1 is a somewhat diagrammatic sectional view of one form of charging unit embodying the present invention.
Fig. 2 is a central sectional view looking toward the left in Fig. 1.

In the various figures of the drawing, the numerals 10 and 11 designate a pair of capacitor units to be charged from an alternating current source. The charged capacitors may be used for any appropriate purpose such as energizing the cathode of an oscillograph, illustrated diagrammatically at 12 in the drawing. The energy for charging the capacitors is derived from a transformer 13 having its primary winding 14 connected to any suitable source of alternating current, such as an ordinary 110 volt lighting circuit. The secondary winding 15 of the transformer 13 is connected by leads 16 and 17 to the filament and plate respectively of a pair of thermionic valves 18 and 19. The other terminal of the winding 15 is connected by a lead 20 to a point 21 between the two capacitors 10 and 11. It will be seen that by this arrangement, during one-half of a cycle, current will flow from the winding 15 through the lead 16 and the valve 18 to the capacitor 10 and back through the lead 20 to the winding 15. During the other half cycle, current will flow in the opposite direction through the lead 20 to the capacitor 11 and back through valve 19 and lead 17 to the winding 15. Current will be prevented from flowing in the opposite directions to the two capacitors and their circuits by the valves 18 and 19 so that charges will be built up in the capacitor units 10 and 11, producing a total voltage between the extreme terminals of these two capacitor units equal to approximately double the peak voltage induced in the winding 15.

In order to operate the two valves 18 and 19, it is of course necessary to heat their filaments. Heretofore it has been the practice to use separate transformers for heating these filaments, thus requiring three transformers in all to charge the capacitors, each having a separate transformer housing. In the charging unit made according to the present invention, the two heating transformers are combined in one and provided with a single primary winding 22 and separate secondary windings 23 and 24. The winding 22 may be connected to a 110 volt lighting circuit or other suitable source of alternating current by means of leads 25. The winding 23 is connected by leads 26 to the filament of the valve 19 and winding 24 is connected by leads 16 and 27 to the filament of the valve 18.

Figure 3:
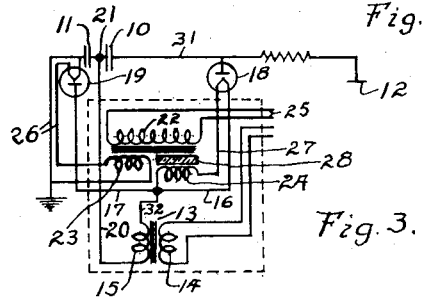
Fig. 3 is a circuit diagram of the connections used in Figs. 1 and 2.

Since the leads 26 are connected to the grounded end of the capacitor units 10 and 11, the insulation for the winding 23 need be only sufficient to withstand the voltage induced in the winding itself. The winding 24, however, is connected to the high potential end of the capacitor stack so that it must be insulated against the maximum voltage of the charge in the capacitor. This extra insulation is shown at 28 in the drawing, being indicated diagramatically in Fig. 3.

The primary winding 22 is wound in two sections on the core 29, one at each side of the secondary winding 23, which is also wound directly on the core 29. As explained above, the windings 22 and 23 require only sufficient insulation for the voltage induced in the coils themselves. About the windings 22 and 23 is placed a porcelain sleeve 28 which is provided with a peripheral groove for the secondary winding 24 so that the winding 24 is insulated from the windings 22 and 23 and from the grounded core by the porcelain sleeve 28. The leads 16 and 27 from the primary winding 24 lead upwardly through an insulator bushing 30 to the thermionic valve 18 which is mounted on the bushing 30 to provide sufficient insulation for the high voltage to which the valve is connected by a lead 31. The lead 17 connecting the valve 19 to the lead 16 may extend from the upper end of the valve 19 directly into the upper end of the bushing 30 at the base of the tube 18, as shown in Fig. 2. The lead 16 is also connected through a lead 32 to the secondary winding 15 of the transformer 13.

As shown in Fig. 2 the transformer 13 comprises two coils wound on separate legs of the core 33. The two windings 14 and 15 are separated by porcelain spools 34 which may be provided with outwardly and inwardly extending flanges 35 and 36 and with supplemental rings 37 of porcelain for overlying the ends of the coils 15. Primary winding 14 may be slid inside of the spool 34 and the secondary winding 15 slid over the outside of the porcelain spool.

I have discovered that porcelain insulation for transformers has many advantages over insulation heretofore used, due to its high specific inductive capacity, its high dielectric strength and its ability to remain unchanged indefinitely irrespective of the conditions to which it is subjected. A transformer insulator of porcelain will retain its mechanical and electrical characteristics, including a substantial constant power factor, much better than where other insulating materials are used, such as have heretofore been employed.

The core 33 is mounted on the bottom of a tank 38 which encloses the transformer 13. The core 29 is attached to the core 33 by clamping plates 39 or any other suitable connecting means. The core 29 and its windings are also enclosed in the tank 38 which may be provided with an outlet box 40 for the primary circuits of the transformers and with bushings 30 and 41 for the secondary leads. The transformer housing may be filled with oil or other suitable insulating liquid.

It will be noted that by connecting the charging transformer winding 15 to the heating circuit for the filament of the valve 18 attached to the ungrounded end of the capacitor unit 10, it is unnecessary to provide a separate bushing for the high potential lead from the transformer winding 15 since the connection is made through the bushing 30 and the filament heating circuit 16—27. The supplemental porcelain sleeve 28 provides ample insulation from the transformer core for this high voltage lead. One of the leads 26 from the winding 23 may be grounded and these leads need be insulated from each other only sufficiently to withstand the voltage applied to the heating circuit for the valve filament. The lead from the mid point between the capacitor units 10 and 11 must of course be insulated for the total voltage of the capacitor unit 11 so that a bushing 41 is required for this lead.

I claim:

1. A transformer comprising a tubular porcelain insulating member having an outwardly extending flange integral with said member at one end thereof and an inwardly extending flange integral with said member at the other end thereof, removable insulating rings disposed opposite said flanges respectively, a core member extending through said insulating member, one winding of said transformer being disposed about said core member within said insulating member and between one of said flanges and one of said removable rings, and another winding of said transformer being disposed outside of said insulating member and between the other flange and removable ring, the wall of said insulating member separating said windings.

2. Means for charging a capacitor comprising a thermionic valve connected to one terminal of said capacitor, the other terminal of said capacitor being grounded, a transformer for heating the filament of said valve, a housing in which said transformer is mounted, a bushing insulator mounted on said housing through which bushing insulator the heating circuit extends from said transformer to said valve, a transformer for charging said capacitor through said valve, the high voltage circuit of said charging transformer being connected within said housing to the circuit of said heating transformer to provide connection for said charging transformer to said valve through said bushing insulator, said transformers being both mounted in the same housing.

3. Means for charging two capacitor units in series comprising a charging transformer having one terminal of the secondary winding thereof connected between said capacitor units, a pair of thermionic valves, the other terminal of the secondary winding of said charging transformer being connected to said capacitors respectively through said valves, a heating transformer for the filaments of said valves comprising a single primary winding and a pair of secondary windings one for each valve respectively, the terminal of said capacitors to which one of said valves is connected being grounded, and supplemental insulation for the transformer secondary winding supplying heating current to the valve connected to the ungrounded terminal of said capacitor.

4. Means for charging a pair of capacitor units connected in series and grounded at one end of said series, the other end of said series being ungrounded, said charging means comprising a pair of thermionic valves connected respectively to the grounded and ungrounded ends of said series, a transformer comprising a single primary winding and a pair of secondary windings for heating the filaments of said valves, a charging transformer having one terminal thereof connected between said capacitors and having the other terminal thereof connected through said valves to the grounded and ungrounded terminals respectively of said series, one terminal of said charging transformer being connected to the ungrounded valve through the heating circuit for the filament of said valve, said transformers being mounted in a common housing, and a single insulating bushing serving to insulate the heating circuit for the ungrounded valve from said housing and hence serving also to insulate the connection from said charging transformer to said valve.

HAROLD L. RORDEN.